United States Patent
Ilhan

(10) Patent No.: US 10,423,060 B2
(45) Date of Patent: Sep. 24, 2019

(54) SMILE MIRROR

(71) Applicant: Salih Berk Ilhan, Ankara (TR)

(72) Inventor: Salih Berk Ilhan, Ankara (TR)

( * ) Notice: Subject to any disclaimer, the term of this patent is extended or adjusted under 35 U.S.C. 154(b) by 160 days.

(21) Appl. No.: 15/313,557

(22) PCT Filed: Mar. 3, 2016

(86) PCT No.: PCT/TR2016/050056
§ 371 (c)(1),
(2) Date: Nov. 23, 2016

(87) PCT Pub. No.: WO2017/151075
PCT Pub. Date: Sep. 8, 2017

(65) Prior Publication Data
US 2018/0224735 A1    Aug. 9, 2018

(51) Int. Cl.
| | |
|---|---|
| *G03B 29/00* | (2006.01) |
| *A47G 1/00* | (2006.01) |
| *G02B 5/08* | (2006.01) |
| *G03B 17/17* | (2006.01) |
| *G03B 17/38* | (2006.01) |
| *G03B 17/48* | (2006.01) |
| *A47G 1/02* | (2006.01) |

(52) U.S. Cl.
CPC ............ *G03B 29/00* (2013.01); *A47G 1/00* (2013.01); *A47G 1/02* (2013.01); *G02B 5/0808* (2013.01); *G03B 17/17* (2013.01); *G03B 17/38* (2013.01); *G03B 17/48* (2013.01); *A47G 2001/007* (2013.01)

(58) Field of Classification Search
CPC ................................. G03B 29/00; A47G 1/02
See application file for complete search history.

(56) References Cited

U.S. PATENT DOCUMENTS

| | | | |
|---|---|---|---|
| 7,970,172 B1 | 6/2011 | Hendrickson | |
| 2009/0181750 A1* | 7/2009 | Nagano ............... | G07F 17/3202 463/20 |

(Continued)

FOREIGN PATENT DOCUMENTS

WO    WO2014209623 A1    12/2014

OTHER PUBLICATIONS http://www.coca-colacompany.com/stories/dispensing-happiness-12-innovative-coca-cola-vending-machines-in-action.
http://www.psfk.com/2010/06/unilevers-smile-activated-ice-cream-machine.html.

*Primary Examiner* — Clayton E. LaBalle
*Assistant Examiner* — Dennis Hancock
(74) *Attorney, Agent, or Firm* — Gokalp Bayramoglu

(57) ABSTRACT

The present invention is related to a smile triggered device (1) for encouraging people to smile, the smile triggered device (1) comprising, a frame (2); a mirror (3) having at least one reflecting surface and installed into the frame (2); a switchable material (4) which can be switched to transparent or non-transparent state and covered on the reflecting surface of the mirror (3); a camera (5) capturing images of the user; a control unit (6) connected to the camera (5) and adapted to processes facial expressions of the user in real time for detecting whether the user smile or not, wherein the control unit (6) changing the state of the switchable material (4) to the transparent state by applying voltage thereto if a smile detected. The mirror (4) function of the smile triggered device (1) is maintained until the user changes his facial expression.

18 Claims, 1 Drawing Sheet

(56) References Cited

U.S. PATENT DOCUMENTS

| | | | | |
|---|---|---|---|---|
| 2010/0296801 A1* | 11/2010 | Lane | ............... | G03B 15/06 |
| | | | | 396/2 |
| 2015/0002768 A1* | 1/2015 | Wu | ............... | G02F 1/13306 |
| | | | | 349/16 |
| 2016/0093081 A1* | 3/2016 | Kim | ............... | G06F 3/012 |
| | | | | 345/156 |
| 2016/0255941 A1* | 9/2016 | Yang | ............... | A45D 42/10 |

\* cited by examiner

SMILE MIRROR

CROSS REFERENCE TO RELATED APPLICATIONS

This application is a national phase entry application of International Application NO. PCT/TR2016/050056, filed on Mar. 3, 2016, the entire contents of which are incorporated herein by reference.

TECHNICAL FIELD

The present invention relates to a mirror which includes a switchable material, a camera and an image processing means for encouraging people to smile. More specifically the present invention relates to a mirror rewarding users with showing their reflection on the mirror only when they smile.

BACKGROUND

A mirror is an object that reflects light. Mirrors are commonly used for personal grooming, decoration, architecture etc. Also, people can check out their facial expressions in the mirrors. According to the "Facial Feedback Hypothesis", facial expressions contribute to how we feel. For instance, voluntarily smiling helps feeling happier, whereas frowning causes stress. In addition to that, mirror neurons in the human brain are triggered when the person looks at someone who has an emotional facial expression. For instance, if a person is looking at another person who has a facial expression that reflects the happiness through smile, the observant is triggered by his/her mirror neurons to mimic the facial expressions of the observed person. In the prior art, a special vending machine in Puerto Rico accepts smiles as currency and rewarding consumers who shared their inner effervescence with an ice cold Coca Cola (see http://www-.coca-colacompany.comistories/dispensing-happiness-12-innovative-coca-cola-vending-machines-in-action). Also Unilever created the first smile activated vending machine (see http://www.psfk.com2010/06/unilevers-smile-activated-ice-cream-machine.html) However, these installations such as the Unilever vending machine and consumer products such as compact cameras and open source smile detect systems are not personal objects that encourages and intrigues users to smile nor help users to see their smiling faces as an outcome of the interaction.

Other smile triggered systems (for example smart phone applications) that use a camera to detect smile do not include mirror or a "smart material" that becomes opaque/transparent or non-reflective/reflective depending on the smile detection. Said "smart materials" are disclosed in some patent documents below.

International patent document numbered WO02014209623 A1, discloses a system for controlling switchable glass based upon intention detection. The system includes a sensor for providing information relating to a posture of a person detected by the sensor, a processor, and switchable glass capable of being switched between transparent and opaque states. The processor is configured to receive the information from the sensor and process the received information in order to determine if an event occurred. This processing includes determining whether the posture of the person indicates a particular intention, such as attempting to take a photo. If the event occurred, the processor is configured to control the state of the switchable glass by switching it to an opaque state to prevent the photo-taking of an object, such as artwork, behind the switchable glass.

United States Patent document numbered U.S. Pat. No. 7,970,172 B1, discloses an active device provides protection from the sun or other bright light source for improved vision, using a switchable glass that is electronically controlled to cast a shadow on an eye of a user and/or to otherwise reduce the amount of the light incident on the eye, thereby reducing glare. Miniature cameras monitor the user's eye movements and the scene in front of the user. If a bright light is detected, one or more dark spots is created in the variable opacity medium that acts as a shade or light filter for a pupil of the eye.

SUMMARY OF THE INVENTION

The objective of the present invention is to provide a smile triggered device that becomes mirror—meaning reflective—when it detects a smile. The purpose of the design is to encourage people to smile by creating this interactive, smile-triggered, system.

Another aspect is related to the self-image and the mirroring feature of human brain. Once the mirror is activated and the user sees herself/himself then mirror neurons in the human brain are triggered and the smile is prolonged. The moment when one sees her/his own reflection is the moment when he/she starts to communicate with herself/himself, and at this moment, the mirror, by showing the person's image when smiling, helps the person to make peace with her/his image and to have positive feelings about herself/himself and life. The mirroring neurons in our brain make us smile when we see a smiling person and to get sad when we see a sad person. The mirroring neurons give us positive feedback when we see ourselves happy in the mirror. "Facial Feedback Hypothesis" tells us that face muscles have an impact on our feelings. That is to say, if we frown (scowl) we feel unpleasant feelings and if we smile we become happy. The inventive smile triggered device makes us happy when we smile by making a facial expression.

The smile triggered device essentially comprising; a frame, a mirror, a switchable material, a camera and a control unit. When the user of the device makes a facial expression to smile, said expression is captured by the camera. Then the control unit processes the image including the facial expression, detects the smile and changes the state of the switchable material coated on the mirror from opaque state to transparent state by applying voltage. Once the switchable material is changed to transparent state, the mirror becomes visible and the user can sees herself/himself on the mirror. The mirror function could either be maintained until the user changes his facial expression or maintained for a predetermined time (for a few seconds 0-10) after the smiling facial expression.

BRIEF DESCRIPTION OF THE DRAWINGS

A smile triggered device developed to fulfill the objectives of the present invention is illustrated in the accompanying figures, in which.

Figure 1:
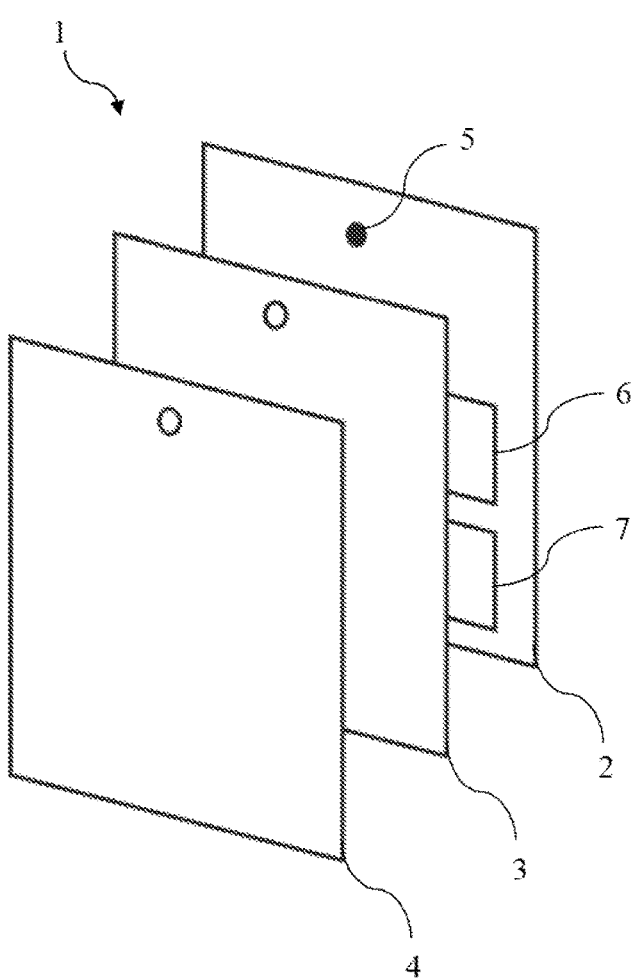
FIG. 1 is the exploded view of the smile triggered device.
Figure 2:
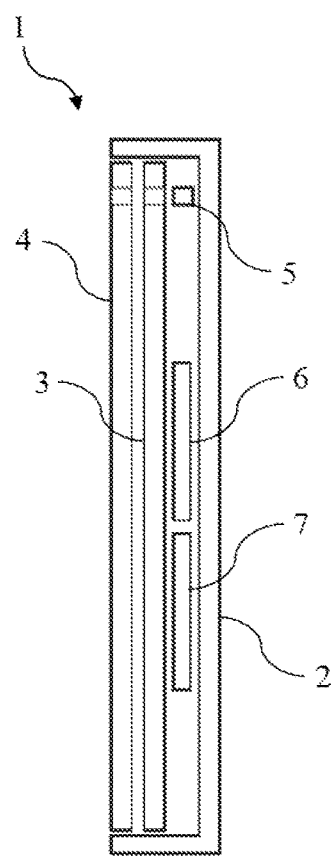
FIG. 2 is the cross-sectional view of the smile triggered device.

The components shown in the figure are each given reference numbers as follows:

1. Smile triggered device
2. Frame

3. Mirror
4. Switchable material
5. Camera
6. Control unit
7. Battery or plug in power

DETAILED DESCRIPTION OF THE INVENTION

Smile triggered device (1) that reflects people's images only when they smile, smile triggered device (1) comprising:
frame (2),
mirror (3) having at least one reflecting surface and installed into frame (2), switchable material (4) which can be switched to transparent or opaque state and covered on the reflecting surface of mirror (3),
camera (5) capturing images of the user,
control unit (6) connected to camera (5) and adapted to processes facial expressions of the user in real time for detecting whether the user smile or not, wherein control unit (6) changing the state of switchable material (4) to the transparent state from opaque state by applying voltage thereto if a smile detected,
at least one of battery (7) or a plug for powering camera (5) and control unit (6).

The inventive smile triggered device (1) is entertaining mirror (3) which allows people to see their reflections only when they smile. In the context of this invention, the user of the device is encouraged to smile to activate mirror (3) function. In the all embodiments of the invention described below, smile triggered device (1) essentially comprising; frame (2), mirror (3), switchable material (4), camera (5) and control unit (6). Camera (5) is disposed on frame (2) or behind mirror (3) and can be any type of digital camera (5) which produces digital images. Camera (5) is electrically connected to control unit (6). Control unit (6) is capable of processing images captured by camera (5) and can be any micro-controllers, for example; Arduino. Raspberry, Custom PCB or the like.

Mirror (3) has a polished or smooth surface (as of glass) that forms images by reflection on which switchable material (4) is coated. Switchable material (4) which is also called "smart glass" or "switchable glass" is a glass or glazing whose light transmission properties are altered when voltage, light or heat is applied. Switchable material (4) changes from translucent to transparent, changing from blocking some (or all) wavelengths of light to letting light pass through. Switchable material (4) includes one of custom LCD (liquid crystal display), electrochromic, photochromic, thermochromic, suspended particle, micro-blind or polymer dispersed liquid crystal devices.

Since smile triggered device (1) is electronic, it requires a power supply or access to electricity source. In the preferred embodiment of the invention, smile triggered device (1) comprising battery (7) for powering camera (5) and control unit (6). In another embodiment, a plug can be used instead of battery (7) for connecting smile triggered device (1) to an electrical socket.

To activate smile triggered device (1), the first step is turning on the device. In one embodiment, device (1) can be turned on by plugging into an electricity socket. In another embodiment, smile triggered device (1) includes a power button having an "ON" and "OFF" state and smile triggered device (1) can be turned on by switching the power button to "ON" position from "OFF" position. In another embodiment, smile triggered device (1) runs on standby mode and employs a motion detection sensor to track nearby movement, so that the motion detection sensor can switch smile triggered device (1) to "on" position when someone approaches.

Once smile triggered device (1) is energized and running, switchable material (4) is in non-reflective state. Non-reflective state can be a graphic, picture, drawing, shape, design, pattern, brand element such as logos or brand marks, words, solid colors or the natural color of the material. Non-reflective state can be fully non-reflective or slightly non-reflective, slightly reflective.

Smile triggered device (1) allows custom graphic applications on mirror (3) in two different embodiment, the first embodiment applies if switchable material (4) is a custom LCD, the second embodiment is if the smart glass is a PDLC. In the custom LCD embodiment, any type of custom 2D (two dimensional) graphic could be installed and showed on the LCD screen during the opaque state. In the PDLC embodiment the visual images, drawings or shapes could be printed, painted or sticked on the top of the reflecting surface of mirror (3) so that the visuals become visible when the PDLC becomes transparent. This feature allows placing brands, messages or images on smile triggered device (1).

After smile triggered device (1) is energized, camera (5) starts to capture image of the user. In one embodiment, the user is either prompted to smile by being shown a word (for example a written message that says "smile" "smile to camera" "smile to see yourself" etc), a shape (for example a visual illustration such as a smiley face) as described above or a light on the product, or by hearing a voice or sound (for example an audio message that is pre-recorded and played by an audio player (speaker)) that prompts to smile. Different voices or sounds can be stored in memory of control unit (6) or an external memory in smile triggered device (1).

When the user smiles, camera (5) captures the smile action from user's face and informs control unit (6). Once control unit (6) detects the "smile" input from camera (5), it changes the state of switchable material (4) from the first state to the second state by applying voltage to switchable material (4). The first state does not reflect the image, whereas the second state reflects the image. Since switchable material (4) is changed to transparent state, mirror (3) becomes visible and the user can see himself on the mirror.

In one embodiment, mirror (4) function is maintained until the user changes his facial expression. In other words, control unit (6) is keeping switchable material (4) in transparent states by applying continuous voltage to switchable material (4) until the user changes his facial expression. When the user changes his facial expression, camera (5) informs control unit (6). Control unit (6) processes the images coming from camera (5). If control unit (6) detects that the user doesn't smile, it stops applying voltage to switchable material (4) to change its state back to the nontransparent state. In another embodiment, mirror (4) function is maintained via control unit (6) by applying continuous voltage for a predetermined time (for a few seconds 0-10) after the smiling facial expression detected.

The invention claimed is:
1. A smile triggered device, wherein the smile triggered device reflects images of a user only when the user smiles, the smile triggered device comprising;
a mirror having at least one reflecting surface,
a switchable material, wherein the switchable material covers the reflecting surface of the mirror and the switchable material is configured to work in a transparent state or an opaque state, and the user sees their reflection only when the user smiles, a camera configured to capture images of the user's face, a control unit connected to the camera and adapted to processes facial expressions of the user in real time detecting whether the user smiles or not, wherein the control unit changes a state of the switchable material to the transparent state from the opaque state by applying voltage thereto only if a smile is detected.

2. The smile triggered device according to claim 1, wherein the mirror is installed into a frame.

3. The smile triggered device according to claim 1, wherein at least one battery powers the camera and the control unit.

4. The smile triggered device according to claim 1, wherein a plug connects the smile triggered device to an electrical socket powering the camera and the control unit.

5. The smile triggered device according to claim 1, wherein a power button has an "ON" state and an "OFF" state and the smile triggered device is turned on by switching the power button to the "ON" state from the "OFF" state.

6. The smile triggered device according to claim 1, wherein the smile triggered device runs on a standby mode and employs a motion detection sensor to track a nearby movement, so that the motion detection sensor switches the smile triggered device to an "on" position when the user approaches the smile triggered device.

7. The smile triggered device according to claim 1, wherein the camera is disposed on a frame or behind the mirror.

8. The smile triggered device according to claim 1, wherein the control unit is selected from the group consisting of Arduino, Raspberry and Custom PCB.

9. The smile triggered device according to claim 1, wherein the switchable material includes one of custom LCD, electrochromic, photochromic, thermochromic, suspended particle, micro-blind or polymer dispersed liquid crystal devices.

10. The smile triggered device according to claim 1, wherein the switchable material in the opaque state is fully non-reflective, or partially non-reflective, once the smile triggered device is energized and running.

11. The smile triggered device according to claim 1, wherein graphics, messages or images are installed and showed on the switchable material during the opaque state.

12. The smile triggered device according to claim 1, wherein the control unit or an external memory stores pre-recorded voices or sounds and plays an audio player or speaker to prompt the user to smile.

13. The smile triggered device according to claim 1, wherein the control unit keeps the switchable material in the transparent state by applying continuous voltage to the switchable material until the user changes facial expression and stops applying the voltage to change the state of the switchable material back to the opaque state if the user doesn't smile.

14. The smile triggered device according to claim 1, wherein the control unit applies continuous voltage for a predetermined time after the smile is detected.

15. The smile triggered device according to claim 1, wherein the switchable material completely covers the reflecting surface of the mirror.

16. The smile triggered device according to claim 1, wherein the switchable material is coated on the mirror.

17. The smile triggered device according to claim 1, wherein the user is prompted to smile from the group consisting of a word, a shape, a light and by hearing a voice or a sound.

18. A smile triggered device, wherein the smile triggered device reflects images of a user only when the user smiles, the smile triggered device consisting of:

a mirror having at least one reflecting surface;

a switchable material, wherein the switchable material covers the reflecting surface of the mirror and the switchable material is configured to work in a transparent state or an opaque state;

a camera configured to capture images of the user's face;

a control unit connected to the camera and adapted to processes facial expressions of the user in real time for detecting whether the user smiles or not;

wherein the control unit changes a state of the switchable material to the transparent state from the opaque state by applying voltage thereto only if a smile is detected;

wherein the switchable material is a PDLC smart glass.

* * * * *